Figures 1, 2:
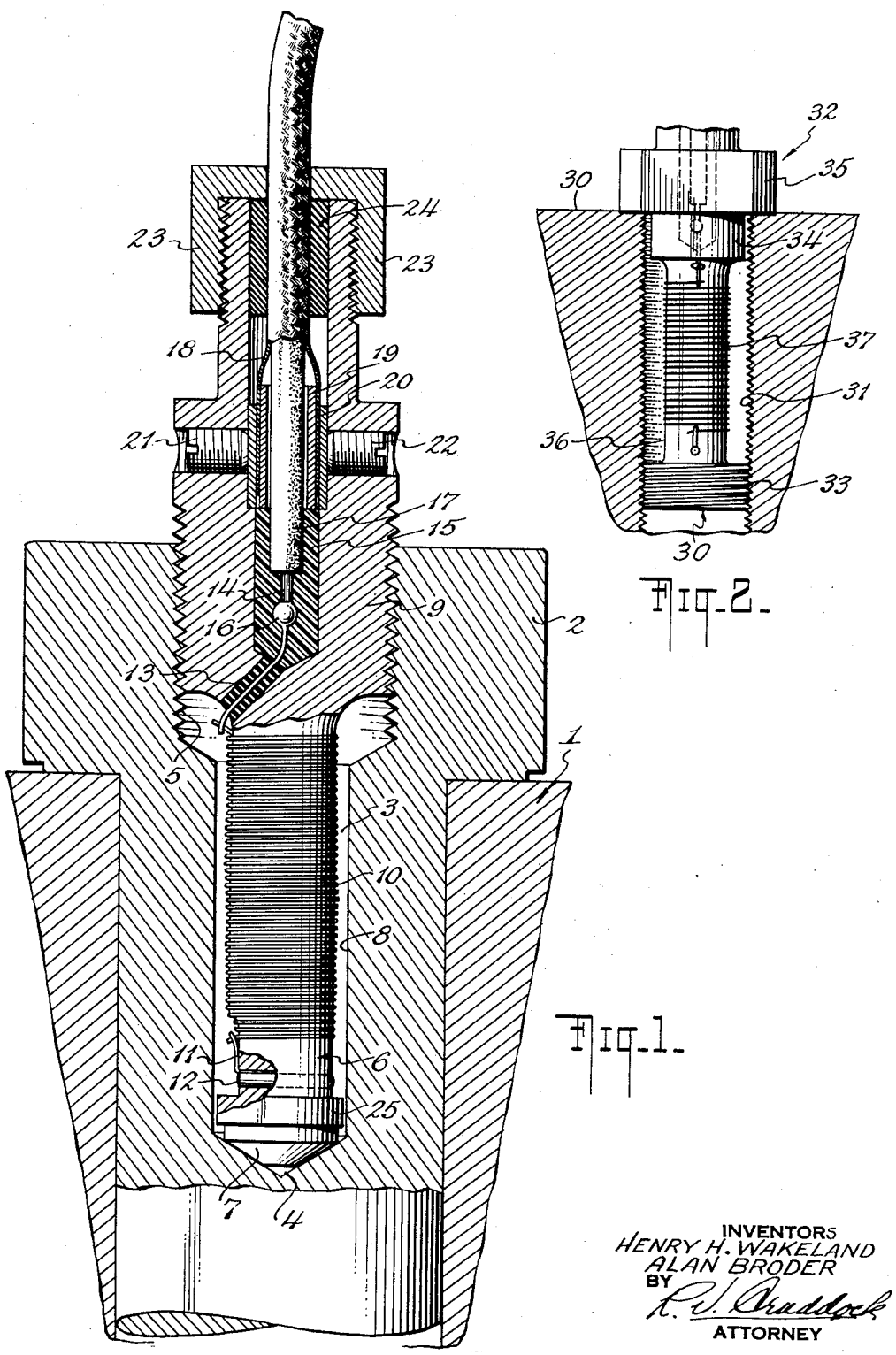

Feb. 16, 1960  H. H. WAKELAND ET AL  2,925,576
STRAIN-SENSITIVE ELECTRICAL PICK-UP DEVICE
Filed Dec. 19, 1955

INVENTORS
HENRY H. WAKELAND
ALAN BRODER
BY
ATTORNEY

United States Patent Office 2,925,576
Patented Feb. 16, 1960

2,925,576

STRAIN-SENSITIVE ELECTRICAL PICK-UP DEVICE

Henry H. Wakeland, Great Neck, and Alan Broder, Glen Oaks, N.Y., assignors to Sperry Rand Corporation, a corporation of Delaware Application December 19, 1955, Serial No. 553,798

7 Claims. (Cl. 338—229)

This invention relates generally to electrical pickup devices of the strain-sensitive type. More particularly, it concerns such devices that include material bonded or otherwise firmly secured thereto having electrical properties which change with changes in the strain imparted to such material.

Electrical pickup devices of the strain-sensitive type are commonly employed for determining the strain of a structural member subjected to static stress. They may also be employed to some extent to facilitate the performance analysis of operating bodies that experience strains of a dynamic nature in the normal course of their operation. For example, variable strains are normally developed in a diesel engine by fuel injector and valve actions. Such strains are of one character respectively when these actions occur properly, and are of different respective characters when they occur improperly. Hence, by obtaining electrial indications of strain from appropriate parts of a strain-subject body such as a diesel engine, the behavior of the body may be evaluated to a useful extent.

The present apparatus, while by no means being limited for use in connection with engine analyzing systems, is nevertheless particularly well-adapted for this purpose. Its response to local strain variation is not only substantially instantaneous, but is such as to faithfully follow such variation whether it be of a static or dynamic, even oscillatory, nature. In brief, the apparatus comprises an elastic column which is coaxially disposed within a bore formed in a fastener element of the body under test or in the body itself. When placed in the bore, the column is given an initial fixed strain between two points axially spaced on the column. Intermediate the axially spaced points, the column has a necked-down portion including electrically strain-sensitive material. That is to say, the column may be formed of electrically strain-sensitive material or be provided with electrically strain-sensitive material bonded or otherwise firmly secured thereto and out of contact with the bore surface. Strain variations in the fastener element or the test body, as the case may be, produce variations in the initial strain of the column which, in turn, variably strain the strain-sensitive material to produce a correspondingly variable electrical effect. Moreover, the apparatus is so constructed and arranged as to inherently provide full protection for its strain-sensitive material from exposure to harmful environmental operating conditions.

The principal object of the present invention is to provide improved electrical pickup apparatus of the strain-sensitive type.

Another object is the provision of such apparatus that responds with great rapidity to changes in strain in the member in which it is located.

Another object is to provide such apparatus that possesses inherent physical protection properties for the benefit of its delicate components.

Another object is the provision of such apparatus that is easily attached to and removed from its test location.

With the foregoing and other objects in view, the present invention includes the novel elements and the combination and arrangements thereof described below and illustrated in the accompanying drawings, wherein Figs. 1 and 2 illustrate, partially in section, embodiments of the present invention employing a strain column under compression and under tension, respectively.

The drawing depicts a strain-subject member 1 rigidly bolted down to a larger body (not shown) by a bolt 2. Member 1, for example, may be one of the bearing supports or journals for the rocker arm shaft of a diesel engine, in which case, bolt 2 would receive strains according to the valve train loads and fuel injector pressures.

The bolt is provided with a blind hole 3 drilled axially of the bolt from the head thereof to a point 4 well into the bolt stem. The mouth of hole 3 is enlarged somewhat and tapped to form a cavity with a threaded sidewall 5 coaxially extending partially into the bolt head. An electrically-conductive columnar element 6 having one end 7 thereof abutting the foot of hole 3 extends from end 7 in spaced coaxial relation with respect to the internal surface 8 of hole 3 to an enlarged portion 9 of the columnar element, partially occupying the enlarger mouth-proximate cavity of hole 3 and extending outwardly therefrom. Portion 9 is of such breadth as to seal the cavity, and its outer surface includes threads which mesh with the threads of side-wall 5.

The necked-down or axially extending portion of columnar element 6 that is spaced in relation to hole surface 8 and located between end 7 and portion 9 is provided with many turns 10 of fine wire, the electrical resistance of which preferably changes linearly with strain applied to the wire over appreciable ranges of wire compression and tension. Turns 10 are insulated from each other and also from columnar element 6, except that the turn nearest the end 7 of element 6 is soldered to a short length of heavier wire 11 which is inserted into a lateral hole in element 6 and firmly electrically connected to element 6 by means of a taper pin 12 driven into the hole. A shallow flat is machined locally on the surface of element 6 where wire length 11 is inserted, so that the connection between this wire and the strain-sensitive wire does not add to the bulk of element 6.

The other end turn of the strain-sensitive wire (that turn nearest the threaded portion 9 of columnar element 6) is soldered to a strand 13 extending from and forming part of a multi-strand conductor 14. Strand 13 passes through an insulated passage linking the space surrounding the necked-down portion of element 6 to the foot of a chamber 15, which chamber runs axially within portion 9 of element 6 in a direction away from the bolt-enclosed necked-down portion. Conductor 14 is longitudinally disposed in chamber 15, and all of its strands, save strand 13, terminate near the foot of the chamber. A blob of solder 16 is applied to the strand terminations to hold them together, strand 13 emerging therefrom for its passage from the foot of chamber 15 to its connection to the strain sensitive wire. A shallow flat is machined on element 6 in the locality of this connection so that the connection does not add to the bulk of element 6.

Conductor 14 is provided with a flexible insulating jacket 17 and with a braided shield 18 around the jacket. The shield is grounded to portion 9 of element 6 by being tightly sandwiched between inner and outer ferrules 19, 20 of conducting material disposed about insulating jacket 17 and urged toward each other by a pair of set screws 21, 22 which are threaded in portion 9 so as to perpendicularly contact the outer ferrule on diametrically opposite sides thereof. Since one end of the strain-sensitive wire is grounded to element 6 and the other end is connected to conductor 14, and since the shield 18 for conductor 14 is also grounded to element 6, then the resistance between conductor 14 and shield 18 is essentially the resistance of the strain-sensitive wire.

Insulating fluid which is later baked to a solid state is injected into chamber 15 to fill all the unoccupied spaces therein, and the chamber is sealed from the surrounding atmosphere with a cap 23 through the top of which the shielded conductor 14 passes. In this regard, cap 23 is screw-fitted over the end of element 6 remote from bolt 2, and is arranged to compress a short length of flexible tubing 24 serving as packing between the shielded conductor and the wall of chamber 15.

Strain-sensitive turns 10 are preferably bonded to element 6 by an insulating varnish or adhesive which is preferably also protectively coated over the turns. If desired, however, turns 10 may be firmly secured to the columnar element by tension, alone, to function in a generally similar manner.

Element 6 is advanced in the threaded side-wall 5 slightly more than is necessary to cause its end 7 to abut the foot of the blind hole 3. Thus, the bolt-enclosed necked-down portion of element 6 is placed under axial compression between its end 7 and the screw threads on its enlarged portion 9. The compressive strain locked up in element 6 is such as to exceed the maximum longitudinal tensile strain expected in bolt 2, whereby loss of contact between the foot of hole 3 and the abutting end 7 of element 6 is prevented over the range of longitudinal strain of the bolt.

For ease of manufacture, it is preferable to employ a standard drill for producing the blind hole 3; in which event, the foot of the hole will be concavo-conical in configuration. It has been found that for satisfactory results with this configuration, the abutting end 7 of columnar element 6 should preferably have a frusto-conical end face whose sloping surface is of a convexity matching the concavity of the foot of hole 3.

To aid in the axial alignment of the wire-wound portion of element 6 in hole 3, a flange 25 having the diameter of the hole is provided on element 6 between the lateral hole 12 and end 7. The flange also provides added protection to the strain-sensitive wire during the insertion of element 6 into hole 3.

In the apparatus described, the member 1, the bolt 2, and the columnar element 6 are fabricated of elastic material, i.e., material that is deformed or strained only during the application of normal stresses thereto. Thus, if member 1 is stressed so as to longitudinally strain the bolt 2, the locked-up compression in the wire-wound portion of columnar element 6 is varied accordingly. If the compression is increased, the column increases slightly in diameter to elongate the strain-sensitive wire and thereby increase the resistance thereof; and if the compression is decreased, the column diameter decreases slightly to shorten the strain-sensitive wire and thereby decrease the resistance thereof.

In order to detect the strain-induced resistance changes in turns 10, a Wheatstone bridge arrangement (not shown) may be employed, remotely located from the apparatus illustrated. Connections to such a bridge arrangement are readily made through conductor 14 and the braided shield 18 surrounding the conductor.

While in the embodiment of Fig. 1, columnar element 6 is placed under an initial compressive strain, the apparatus may be modified to employ an initial tensile strain in its enclosed portions. Moreover, within the scope of the invention, the installation may be made directly in a strain-subject member other than a bolt or other fastening device associated with a larger body. Accordingly, in the embodiment of Fig. 2, a strain-subject member 30 is provided with a hole 31 which is completely threaded. Member 30, in this instance, may be the rocker arm, for example, of a diesel engine, in which case it would be strained according to the valve train loads and fuel injector pressures communicated to it while the engine is in operation. Hole 31 need not be a blind hole.

A columnar element 32 (Fig. 2), corresponding to element 6 of Fig. 1, has an end portion 33 threaded to mesh with the threads in hole 31. Another end portion 34 is unthreaded to slip into hole 31, and is provided with an outer flange 35 that abuts member 30 to cover the mouth of the hole when element 32 is screwed into the hole. Between the end portions 33 and 34, element 32 is necked-down to form an intermediate portion 36 upon which the strain sensitive material, depicted as strain wire 37, is disposed out of contact with the surface of hole 31. By this arrangement, the desired initial tensile strain is set up in element 32 between flange 35 and threaded portion 33 by screwing element 32 into hole 31 slightly more than is necessary to cause flange 35 to abut the mouth of the hole. Thus, any deformation of member 30 between the flange-sealed mouth of hole 31 and portion 33 of element 32 causes a corresponding change in the pre-tension of element 32, which change is sensed by strain wire 37. The pre-tension locked up in element 32 is made sufficient to prevent loss of contact between flange 35 and member 30 over the range of strain of the member.

Since many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

What is claimed is:

1. In combination with a strain-subject elastic body member having a bore therein, apparatus for producing an electrical effect according to deformations of said member that occur adjacent said bore, said apparatus comprising an elastic columnar element coaxially disposed within said bore and secured under a fixed initial strain between two portions of said element spaced along the length of said bore and said element, said fixed initial strain being greater than the strain to be experienced by said strain-subject member during operation thereof, said element having a third portion intermediate said spaced portions necked down to provide a surrounding space between the columnar surface of said intermediate portion and the internal surface of said bore, said third portion including strain-responsive means electrically sensitive to changes in the initial strain of said intermediate portion induced by said deformations of said member whereby said two portions of said element remain in contact with said member during operation thereof.

2. In combination with a strain-subject elastic body member having a blind bore therein, apparatus for producing an electrical effect according to deformations of said member that occur adjacent said bore, said apparatus comprising an elastic columnar element coaxially disposed within said bore and secured under compression between the foot and the mouth of said bore, said compression being greater than the tension to be experienced by said strain-subject member during operation thereof, said element being so constructed and arranged that a portion thereof proximate said bore mouth forms a seal for said mouth while a portion thereof intermediate said mouth and foot is necked down to provide a surrounding space between the columnar surface of said intermediate portion and the internal surface of said bore, whereby to permit deformation of said intermediate portion according to said deformations of said body member, and a strain-responsive wire element wound out of contact with said bore surface upon said intermediate portion so as to be sensitive to said deformation of said intermediate portion whereby said element remains secured between the foot and the mouth of said bore during operation of said member.

3. In combination with a strain-subject elastic body member having a blind bore therein, apparatus for producing an electrical effect according to deformations of said member that occur adjacent said bore, said apparatus comprising an elastic columnar element having one end thereof abutting the foot of said bore, said element extending from said abutting end thereof in spaced coaxial relation with respect to the internal surface of said bore to an enlarged portion of said element proximate the mouth of said bore, said enlarged portion forming a seal for said mouth and being secured to said bore surface so as to place the bore-spaced portion of said element under axial compression, said axial compression being greater than the tension to be experienced by said strain-subject member during operation thereof, and electrically responsive strain sensing means associated with said bore-spaced portion for sensing changes in said compression due to said deformations of said body member whereby said element remains secured to said member during operation thereof.

4. The combination of claim 3 wherein the columnar element is provided with a second enlarged portion proximate its abutting end for maintaining the spaced coaxial relation of said element with respect to the internal surface of the bore.

5. A fastener device adapted to form part of a strain-subject body member, said device having a blind bore extending axially into said device, an elastic columnar element having one end thereof abutting the foot of said bore, said element extending from said abutting end thereof in spaced coaxial relation with respect to the internal surface of said bore to an enlarged portion of said element proximate the mouth of said bore, said enlarged portion forming a seal for said mouth and being secured to said bore surface so as to place the bore-spaced portion of said element under axial strain, said axial strain being greater than the strain to be experienced by said strain-subject member during operation thereof, and a strain-responsive wire element wound out of contact with said bore surface upon said bore-spaced portion of said element so as to be sensitive to changes in said axial strain produced by strain communicated to said bore-spaced portion by way of said fastener device from said body member whereby said element remains under axial strain during operation of said member.

6. A pick-up device for electrically sensing strain variations in a body member, said device comprising a bolt adapted to be inserted into said body member and rigidly secured thereto, said bolt having a blind bore extending axially into the bolt from the head thereof, an elastic columnar element having one of its ends abutting the foot of said bore, said element extending from said abutting end thereof in spaced coaxial relation with respect to the internal surface of said bore to an enlarged portion of said element proximate the mouth of said bore, said enlarged portion forming a seal for said mouth and being secured to said bore surface so as to place the bore-spaced portion of said element under axial strain, said axial strain being greater than the strain to be experienced by said body member during operation thereof, a strain-responsive wire filament wound out of contact with said bore surface upon said bore-spaced portion of said element so as to change in resistance according to changes in said axial strain resulting from the communication through said bolt of said strain variations to said bore-spaced portion, and means connected to said strain sensing means for providing an electrical conductive path through said elastic columnar element whereby said element remains under axial strain during operation of said member.

7. A test device for electrically sensing strain in a body member, said device comprising a bolt adapted to be rigidly installed in said body member, said bolt having a blind hole drilled from the head of the bolt and extending into the stem thereof, the base of said hole being concave-conical in configuration, an elastic columnar element having a frusto-conical end face of convexity matching the concavity of said hole base and disposed in abutting relation to said hole base, said element extending from said abutting end face thereof in spaced coaxial relation with respect to the internal surface of said blind hole to an enlarged portion of said element proximate the mouth of said hole, said enlarged portion forming a seal for said mouth and being secured to said hole surface so as to place the spaced portion of said element under axial compression, said axial compression being greater than the axial tension to be experienced by said body member during operation thereof, a strain-responsive wire element wound out of contact with said hole surface upon said spaced portion of said element so as to be sensitive to changes in said compression produced by strain variations communicated to said element by way of said bolt from said body member, and means connected to said strain sensing means for providing an electrical conductive path through said elastic columnar element having at least one portion thereof passing within one extremity of said element whereby said element remains under axial compression during operation of said body member.

References Cited in the file of this patent

UNITED STATES PATENTS

| | | |
|---|---|---|
| 2,292,549 | Simmons | Aug. 11, 1942 |
| 2,393,714 | Simmons | Jan. 29, 1946 |
| 2,472,045 | Gibbons | May 31, 1949 |
| 2,633,019 | Albrecht et al. | Mar. 31, 1953 |
| 2,637,210 | Hathaway | May 5, 1953 |
| 2,663,781 | Rundell | Dec. 22, 1953 |
| 2,795,134 | Weber et al. | June 11, 1957 |